United States Patent
Hu et al.

(10) Patent No.: US 10,396,922 B2
(45) Date of Patent: Aug. 27, 2019

(54) APPARATUS AND MECHANISM TO SUPPORT MULTIPLE TIME DOMAINS IN A SINGLE SOC FOR TIME SENSITIVE NETWORK

(71) Applicant: TEXAS INSTRUMENTS INCORPORATED, Dallas, TX (US)

(72) Inventors: Chunhua Hu, Plano, TX (US); Venkateswar Reddy Kowkutla, Allen, TX (US); Eric Hansen, McKinney, TX (US); Denis Beaudoin, Rowlett, TX (US); Thomas Anton Leyrer, Geisenhausen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 10 days.

(21) Appl. No.: 15/891,227

(22) Filed: Feb. 7, 2018

(65) Prior Publication Data
US 2018/0227067 A1    Aug. 9, 2018

Related U.S. Application Data

(60) Provisional application No. 62/455,730, filed on Feb. 7, 2017.

(51) Int. Cl.
*H04J 3/06* (2006.01)
*H04L 7/00* (2006.01)

(52) U.S. Cl.
CPC .......... *H04J 3/0658* (2013.01); *H04J 3/0641* (2013.01); *H04J 3/0676* (2013.01); *H04J 3/0679* (2013.01);
(Continued)

(58) Field of Classification Search
CPC ...... H04J 3/0658; H04J 3/0676; H04J 3/0679; H04J 3/0691; H04J 3/0641; H04J 3/0688;
(Continued)

(56) References Cited

U.S. PATENT DOCUMENTS

| | | | | | |
|---|---|---|---|---|---|
| 4,156,200 A | * | 5/1979 | Gomez | ..................... | H03K 5/22 327/292 |
| 5,274,678 A | * | 12/1993 | Ferolito | ................. | H04L 7/0083 327/141 |

(Continued)

FOREIGN PATENT DOCUMENTS

EP    1087563    * 11/1999    ............... H04L 1/22

*Primary Examiner* — Warner Wong
(74) *Attorney, Agent, or Firm* — Kenneth Liu; Charles A. Brill; Frank D. Cimino (57) ABSTRACT

A system on a chip (SOC) is configured to support multiple time domains within a time-sensitive networking (TSN) environment. TSN extends Ethernet networks to support a deterministic and high-availability communication on Layer 2 (data link layer of open system interconnect "OSI" model) for time coordinated capabilities such as industrial automation and control applications. Processors in a system may have an application time domain separate from the communication time domain. In addition, each type time domain may also have multiple potential time masters to drive synchronization for fault tolerance. The SoC supports multiple time domains driven by different time masters and graceful time master switching. Timing masters may be switched at run-time in case of a failure in the system. Software drives the SoC to establish communication paths through a sync router to facilitate communication between time providers and time consumers. Multiple time sources are supported.

25 Claims, 9 Drawing Sheets

(52) U.S. Cl.
CPC ........... *H04J 3/0691* (2013.01); *H04J 3/0667* (2013.01); *H04J 3/0688* (2013.01); *H04L 7/0083* (2013.01)

(58) Field of Classification Search
CPC .... H04J 3/06; H04J 3/0635; H04J 2013/0096; H04J 3/0638; H04J 3/0644; H04L 2012/5674; H04L 27/2655; H04L 7/0008; H04L 7/0083; H04L 7/027
See application file for complete search history.

(56) References Cited

U.S. PATENT DOCUMENTS

| | | | | |
|---|---|---|---|---|
| 5,642,069 A | * | 6/1997 | Waite | G06F 11/0751 327/18 |
| 5,969,558 A | * | 10/1999 | Abe | G01R 31/3016 327/20 |
| 6,239,626 B1 | * | 5/2001 | Chesavage | G06F 1/08 327/147 |
| 6,295,045 B1 | * | 9/2001 | Furuhashi | G09G 3/3611 345/213 |
| 6,452,426 B1 | * | 9/2002 | Tamarapalli | G06F 1/08 327/166 |
| 7,321,244 B2 | * | 1/2008 | Kobayashi | G06F 1/04 327/294 |
| 10,027,433 B2 | * | 7/2018 | Philip | G06F 1/04 |
| 2003/0034820 A1 | * | 2/2003 | Starr | G06F 1/08 327/292 |
| 2004/0123174 A1 | * | 6/2004 | Dhupar | H04J 3/0638 713/401 |
| 2006/0139081 A1 | * | 6/2006 | Van Den Berg | H04J 3/0688 327/291 |
| 2010/0172453 A1 | * | 7/2010 | Cankaya | H04J 3/0641 375/355 |
| 2013/0227008 A1 | * | 8/2013 | Yang | G06F 1/12 709/204 |
| 2014/0003199 A1 | * | 1/2014 | Dougan | G04G 7/00 368/46 |
| 2014/0281037 A1 | * | 9/2014 | Spada | H04L 69/28 709/248 |
| 2018/0062780 A1 | * | 3/2018 | Shimizu | H04J 3/0667 |

\* cited by examiner

APPARATUS AND MECHANISM TO SUPPORT MULTIPLE TIME DOMAINS IN A SINGLE SOC FOR TIME SENSITIVE NETWORK

RELATED APPLICATIONS

This application claims priority to U.S. Provisional Application No. 62/455,730, filed Feb. 7, 2017, which is hereby incorporated by reference.

BACKGROUND

TSN (Time-Sensitive Networking) extends the functionality of Ethernet networks to support a deterministic and high-availability communication on Layer 2 of the seven layer Open Systems Interconnect (OSI) model. TSN is typically used to support applications for industrial automation and control applications. For example, these applications may support a manufacturing assembly line, audio/video streaming, autonomous driving, electrical control systems, chemical control systems, and other applications where precise real-time coordinated control of multiple devices may be required. In a typical TSN, time may originate and be communicated using a variety of known protocols and communication technologies including but not limited to, Global Positioning Satellite (GPS), Industrial Ethernet, Peripheral Component Interconnect Express (PCIe), Precision Time Means (PTM), Industrial Communications Subsystem (ICSS), and Common Platform Time Sync (CPTS). TSN is a set of standards under development by the Time-Sensitive Networking task group of the IEEE 802.1 working group. Time in a TSN network is usually distributed from one central time source directly through the network itself using the IEEE 1588 Precision Time Protocol, which utilizes Ethernet frames to distribute time synchronization information (e.g., time sync info). In addition to the IEEE 1588 specification there is a subset of overall options available for TSN implementations that is referred to as IEEE 802.1AS. The subset narrows the complete list of IEEE 1588 options down to a manageable few critical options that are applicable to Home networks or networks in automotive car or industrial automation environments. Each of these specifications is available from the IEEE and incorporated herein by reference in their entirety. For conciseness, the details of time transmission within actual Ethernet frames (i.e., the structure of the packets) will not be repeated directly in this disclosure but may be found in the above mentioned specifications.

In addition to controlling devices, TSN applications may be used to perform mission critical monitoring of sensors to coordinate and correlate readings taken at different points (e.g., different locations or different phases) of an overall system. In order to achieve appropriate real-time scheduling, all the components in the TSN that must function in a coordinated manner with high precision timing information must receive that timing information consistently with each other. Actual real-world clock time is not necessarily as important as a time domain that explains to other portions of the overall system how to work relative to each other. In such a system, it is normal to have multiple time domains for multiple sets of different functions. Each set of highly related functions may be assigned to a single domain for either communication, application, or both. Other sets of highly integrated functions may be in a second domain. There may also be a relation maintained to understand time differences across the different domains and types of domains (both communication and application). For example, normally individual processors in the system may have a separate application time domain from a communication time domain for that processor. In addition, each type time domain may also have multiple time masters to drive synchronization and for redundancy purpose (e.g., system failure of device or communication interruption).

In current systems utilizing TSN information and coordinating across different domains, a software approach is utilized. In a software solution, the accuracy of time coordination and deviation thereof may be on the order of milliseconds (ms) or worse. In contrast, the hardware mechanism described in this disclosure may achieve nanosecond (ns) accuracy. As will be recognized, accuracy of the timing synchronization may be directly translated to a more deterministic network and, in turn, provide better support for real-time applications used in industrial automation and industrial control.

The examples of this disclosure may also provide a hardware mechanism to allow each peripheral to choose its master clock domain source independently. This increased flexibility and functionality may further provide a graceful way for any specific peripheral (e.g., processor, device, time consumer) to change its time domain master, and possibly that peripheral's input time source (e.g., GPS, industrial Ethernet, PCIe, etc.) during run time. Changing a time domain master may be required for many different reasons including redundancy and fail-over capabilities.

SUMMARY

In a first disclosed example, a hardware mechanism (e.g., an event sync router) is described that allows an SoC to precisely support multiple time domains concurrently and allow each time sync slave to select its time master independently. In addition, the SoC configured with a sync router provides a mechanism for the SoC to understand the relationship among different time domains in the context of a time sensitive network. From the sync router point of view, the time master sends time information to the sync router and the time slave receives timing information from the sync router.

In a second disclosed example, an agent type software (or firmware) application may be used to control registers on the sync router that in turn control programmable logic gates within the sync router to create appropriate communication paths through the sync router. These paths may be used for sharing signals from particular inputs representing (or connected to) a time source to particular outputs representing or connected to a time consumer. Through configuration as accomplished by the agent setting appropriate register values, time signals may be properly directed from the provider to each consumer. Multiple time domains may be supported on a single SoC configured with a sync router. Time domains can include application time domains and communication time domains and different types of sources (e.g., Global Positioning System, PCIe, industrial Ethernet, etc.) may provide time inputs.

BRIEF DESCRIPTION OF THE DRAWINGS

For a detailed description of various examples, reference will now be made to the accompanying drawings, in which.

DETAILED DESCRIPTION

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Examples may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

A typical SoC has multiple hardware components, including but not limited to:
- a microcontroller, microprocessor or digital signal processor (DSP) core—multiprocessor SoCs (MPSoC) having more than one processor core;
- memory blocks including a selection of ROM, RAM, EEPROM and/or flash memory;
- timing sources including oscillators and phase-locked loops;
- peripherals including counter-timers, real-time timers and power-on reset generators;
- external interfaces, including industry standards such as USB, FireWire, Ethernet, QSART; SPI;
- analog interfaces including ADCs and DACs; and
- voltage regulators and power management circuits.

An SoC includes both the hardware, described above, and the software controlling the microcontroller, microprocessor or DSP cores, peripherals and interfaces. In electronic design, a semiconductor intellectual property ("IP") core (often referred to as an "IP core," or "IP block") references a reusable unit of logic, cell, or integrated circuit (commonly called a "chip") layout and design. It gets its name because it may refer to information that is the legal Intellectual Property of a particular party.

In the context of this disclosure, IP will refer to the logic and/or metadata associated with design specifications of a chip or System on a Chip ("SoC"). In this disclosure a set of IP referred to as a "sync router" will be explained. The sync router IP may be implemented as an event router on an SoC to control communication paths between time sources and time consumers for either an application time domain or a communication time domain (or multiples thereof). The sync router may also include control software to update registers to configure programmable logic gates to accomplish the appropriate communication paths to support the multiple time domains and allow applications and endpoints to individually determine their appropriate domain master and facilitate transition to a new master as required for redundancy. Applications executing on processor cores of this SoC, other SoC, or external endpoints may be configured to communicate with the control software of the sync router to set or adjust communication paths. From the sync router point of view, the time master sends time information to the sync router and the time slave receives timing information from the sync router.

Figure 1:
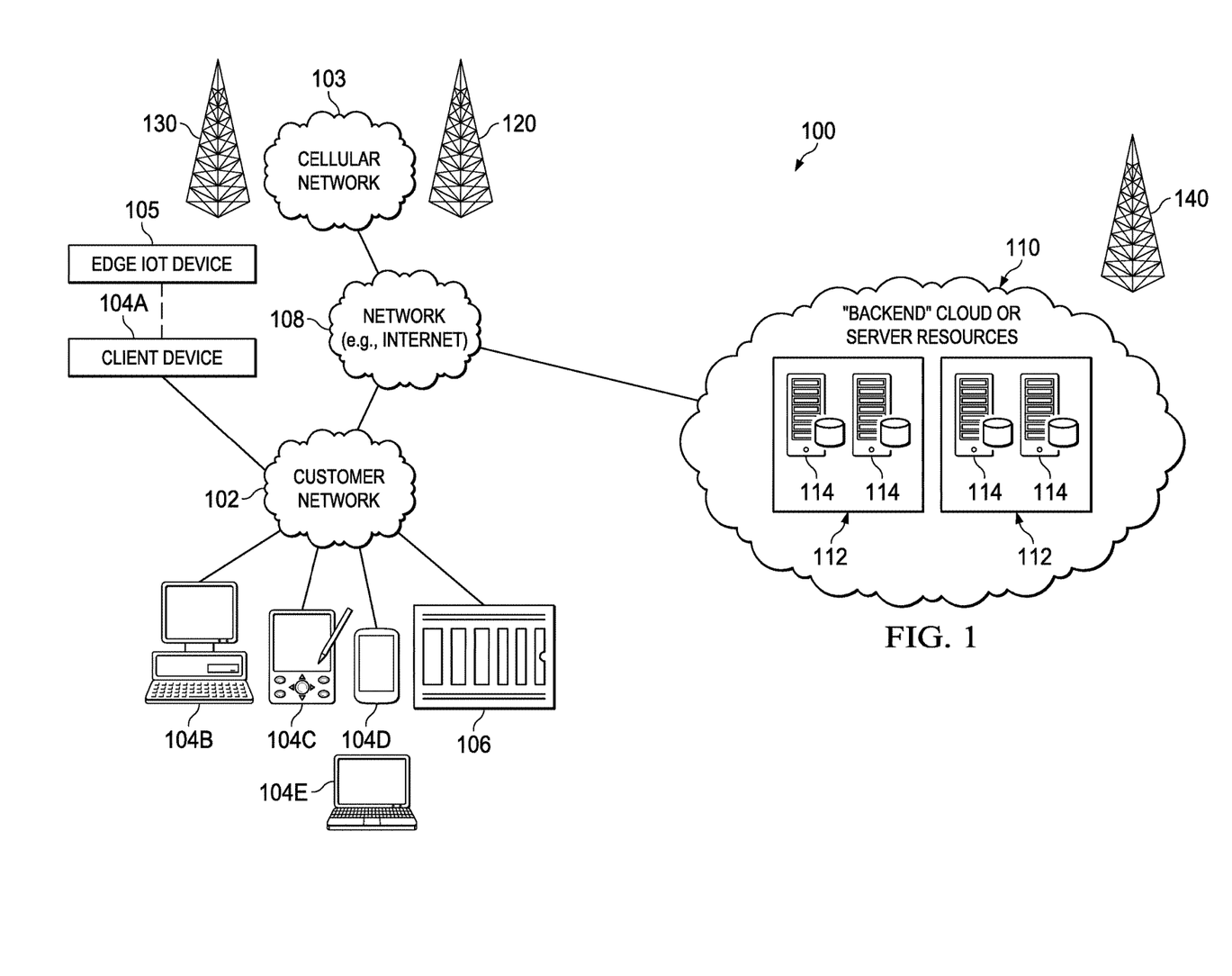
FIG. 1 illustrates a block diagram of an example of a networked computing infrastructure 100 where implementations of the present disclosure may operate.

Referring now to FIG. 1, networked computing infrastructure 100 is illustrated in block diagram format and represents an example of where implementations of the present disclosure may operate. Networked computing infrastructure 100 includes a customer network 102, network 108, and a "backend" cloud or server resources platform/network 110. In one example, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another example, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with backend cloud or server resources platform/network 110. Client devices 104A-E may be computing systems such as desktop computer 104B, tablet computer 104C, mobile phone 104D, laptop computer 104E (shown as wireless), and/or other types of computing systems generically shown as client device 104A. Networked computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and backend cloud or server resources platform/network 110. Local compute resource 106 may also facilitate communication between other external applications, data sources, and services, and customer network 102.

Networked computing infrastructure 100 also includes cellular network 103 for use with mobile communication devices. Mobile cellular networks support mobile phones and many other types of mobile devices such as laptops etc. Mobile devices in networked computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 1046 and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and backend cloud or server resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, backend cloud or server resources platform/network 110 is illustrated as a remote network (e.g., a cloud network) that is able to communicate with client devices 104A-E via customer network 102 and network 108. The functions of backend cloud or server resources platform/network 110 could be performed by systems that are part of customer network 102 (i.e., dedicated customer server resources), however when implemented using a cloud infrastructure as shown, backend cloud or server resources platform/network 110 acts as a platform that provides additional computing resources to the client devices 104A-E and/or customer network 102. For example, by utilizing backend cloud or server resources platform/network 110, users of client devices 104A-E may be able to build and execute applications, such as automated processes for various enterprise, IT, and/or other organization-related functions. In one example, backend cloud or server resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within backend cloud or server resources platform/network 110, network operators may choose to configure data centers 112 using a variety of computing infrastructures. In one example, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another example, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access backend cloud or server resources platform/network 110, and customer-driven upgrade schedules.

Figure 2:
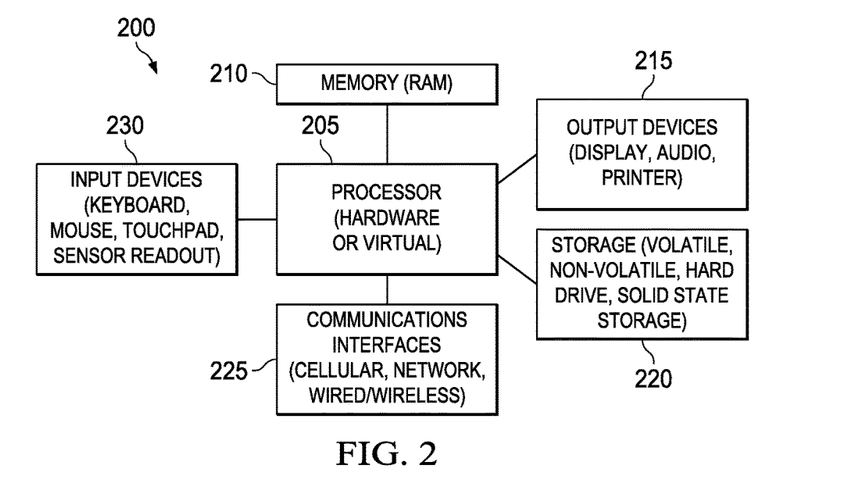
FIG. 2 illustrates high-level block diagram 200 of a computing device (computing system) which may be used to implement portions of a time-sensitive network or control devices of an industrial automation system according to the present disclosure.

FIG. 2 illustrates a high-level block diagram of a computing device 200 (computing system) that may be used to implement one or more disclosed examples (e.g., a service provider cloud infrastructure such as backend cloud or backend server resources 110, client devices 104A-104E, server instances 114, data centers 112, etc.). For example, computing device 200, illustrated in FIG. 2, could represent a client device or a physical server device and could include either hardware or virtual processor(s) depending on the level of abstraction of the computing device. In some instances (without abstraction) computing device 200 and its elements as shown in FIG. 2 each relate to physical hardware and in some instances one, more, or all of the elements could be implemented using emulators or virtual machines as levels of abstraction. In any case, no matter how many levels of abstraction away from the physical hardware, computing device 200 at its lowest level may be implemented on physical hardware. As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also include one or more transceivers that utilize the Ethernet, power line communication (PLC), Wi-Fi, cellular, and/or other communication methods.

As illustrated in FIG. 2, computing device 200 includes a processing element, such as processor 205, that contains one or more hardware processors, where each hardware processor may have a single or multiple processor cores. In one example, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that includes a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may include other components well known in the art, such as sensors, powers sources, and/or analog-to-digital converters, not explicitly shown in FIG. 2.

Overview of Using a Sync Router in a TSN

Figure 3:
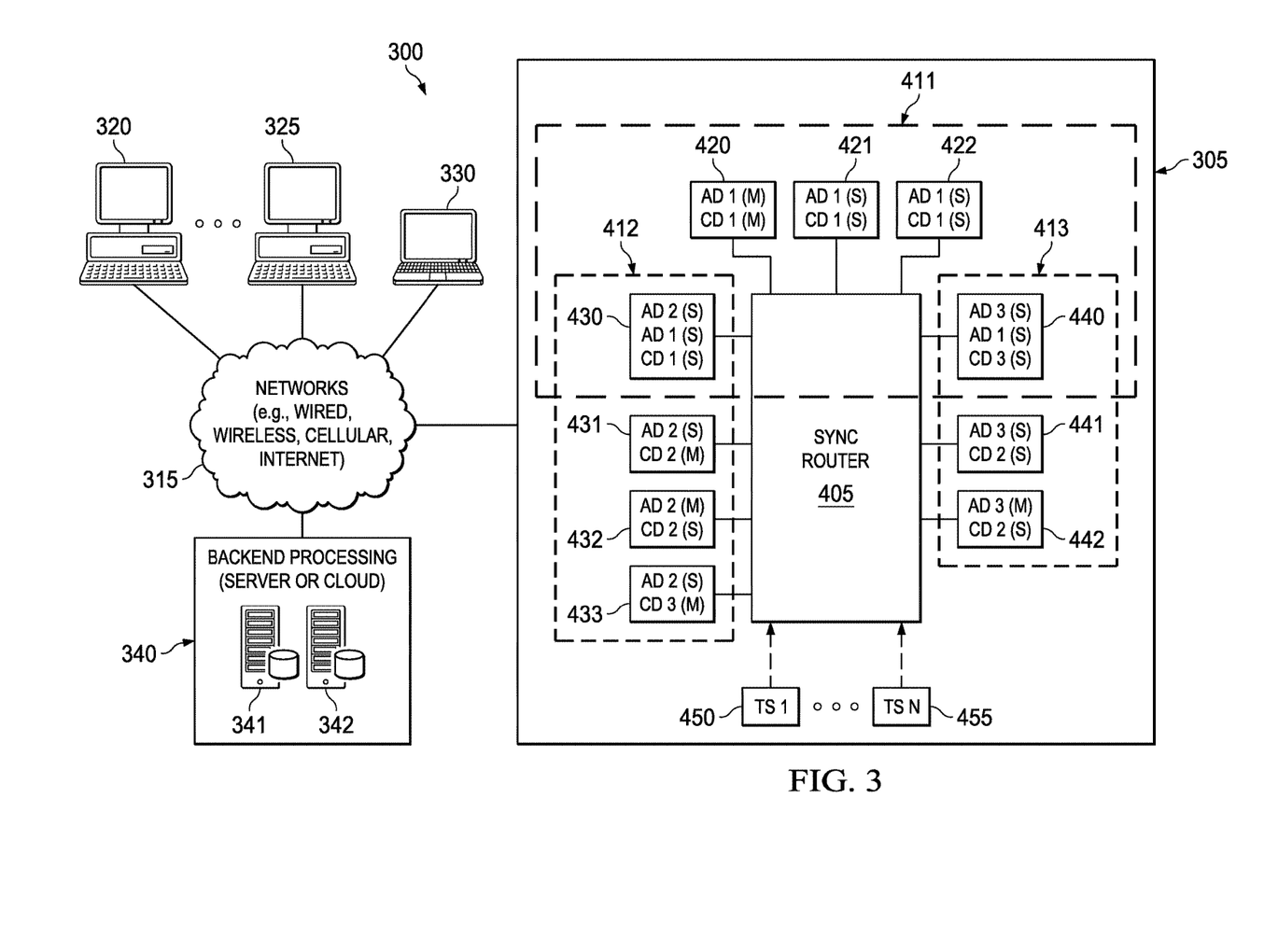
FIG. 3 illustrates block diagram 300 of an industrial automation system comprising a plurality of endpoints and a sync router configured to facilitate a TSN between the endpoints with multiple time domains of both application and communication types and other devices in communication with the TSN according to the present disclosure.
Figure 4:
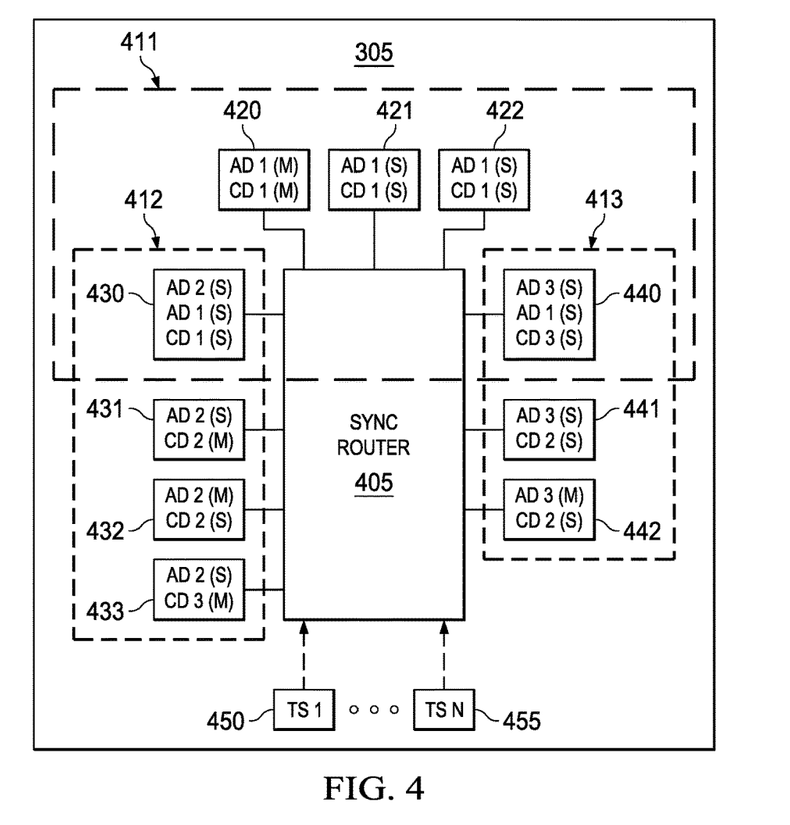
FIG. 4 illustrates block diagram 305 in greater detail to explain the plurality of endpoints and multiple time domains of different types as introduced in FIG. 3, according to one or more disclosed implementations.

The following few paragraphs present an overview of using a sync router SoC in multiple different use cases for coordination of devices (endpoints, slaves and masters) within a TSN. Certain capabilities of the sync router IP will be discussed within the context of these implementations as illustrated in FIGS. 3 and 4. Details of the "internals," control flow, and communications will be discussed below with reference to FIGS. 5-8A-C.

In one implementation, a sync router may be configured to include at least the following hardware mechanisms: 1) A centralized sync router to allow each time sync slave to independently choose its time sync master sources. The time sync master can come from various sources, such as GPS plus from the pin, master time information from another time sync peripheral, or it can be an independent clock source. 2) A distributed local time to each peripheral, which may individually compensate both on frequency and phase shift to its time master. 3) A free running local counter, which may distribute its counter value to all the modules in an SoC as a common reference for all the tasks running in that SoC. The free running local counter may not only be used for software scheduling, but may also be used for time stamp events across one or more SoCs. In this manner it is possible to provide a common reference to all the time domains, so the difference among time domains (frequency and phase) can be calculated. Also, the frequency and phase difference between master time and slave time may also be calculated. Because a master timer and a slave timer may use different oscillators, the slave oscillator may have a frequency drift due to environmental (e.g., humidity or temperature) or other reasons. The phase difference can be further contributed to because of varied latency paths to propagate master time. Accordingly, the slave time may require constant adjustment to make sure it has its frequency and phase locked with the master time. 4) A centralized time stamp block (e.g., centralized CPTS) may be used to time stamp the events coming from multiple master clock domains. The time stamp values of those events may be used to calculate the frequency difference and as well as phase difference among those master clock domains. As explained above a centralized sync router represents a hardware mechanism to allow each time sync slave to tune to any time sync master independently. The hardware mechanism provides a deterministic pairing behavior between master and slave, at least in part, by creating a communication path through the sync router. This may include a common reference counter to all the time domains and the centralized time stamp mechanism, so the system may maintain an overall view of any differences for the complete set of time domains within the SoC.

For example, if a host (a PCIe that is a host may also represent the time master for the PCIe network) generates a post every millisecond, each endpoint can receive that post. Based on that information it may be determined, with respect to a given slave endpoint, if there is any frequency drift or delay. Among the problems that may be solved by a sync router system, the system level issue to allow time domains to change dynamically is addressed. Dynamically changing time domains in a TSN system may be helpful to address a system failure or communication failure. For example, if a master clock goes down a backup can take over. Another reason for dynamically changing a time domain may be as a result of a set of highly integrated applications (e.g., applications in a single application time domain) requesting a reconfiguration of their application time domain. In some cases, two different application time domains may desire to be synchronized and become a single application time domain. Using the disclosed sync router hardware based solution, a flexible method to allow switching to different time masters selected from multiple possible time masters may be provided (See FIG. 9).

In some implementations, any endpoint can pick its own master by communicating with the sync router (possibly via a software agent used to configure the sync router dynamically). Registers on the sync router may be updated to alter the communication path through the switch of the sync router to cause an endpoint (consumer of time) to communicate with a different master. PCIe, Industrial Ethernet, and other types of communication protocols may be used to communicate and provide time information. Different network configurations can overlay each other to facilitate communication between time consumers and time providers (e.g., master clock source).

The sync router may contain multiple interface ports and applications communicating to these ports may represent different endpoints in potentially different time domains. Further, each SoC can execute multiple applications concurrently, and the sync router can connect these concurrently executing applications with a master clock (time source) as appropriate for the application. As mentioned above, from the sync router point of view, the time master sends time information to the sync router and the time slave receives timing information from the sync router.

As mentioned above, there are two sides of an industrial control system: a) software which programs IO (referred to as an application time domain) and b) IO which is transmitted over Ethernet (referred to as a communication time domain). Control of the master of the system which runs the control software is typically an application executing on a CPU and inside the memory of an SoC. The application may have control codes to, for example, switch on or off a device which is connected via Ethernet. At a network node or device (slave in the network) a control application can be as simple as a simple output through a general purpose input/output (GPIO) that may be programmed (controlled) over Ethernet. A GPIO may perform a function which turns on the switch or reads in data over the GPIO SOC interface (or possibly PCIe) at a given (very specific) time. Simple IO to control an application or device can be contrasted with more complex IOs that control more complex applications (e.g., a motor control function). These applications may use a more robust control interface than GPIO. Specifically, when controlling a motor the information may not simply be read as in input because the application may also control motor speed and/or motor precision. In another example, temperature may be read at a given time over an analog digital control (ADC).

In general, in a TSN, the device side is typically a communication slave to the master which is the software (e.g., process control software) that runs on the SoC. Chips may include applications that don't know their role (master or device) and can dynamically change between master and device on different cycles. Further, an SoC can run multiple applications on its multiple cores concurrently with each application working independently or with one or more of the other applications. Applications working together may desire to utilize a consistent time domain that is controlled by the same master clock. The sync router provides the capability for each consumer of a time event to determine its appropriate master and provide for graceful failover in the event of system or communication failure.

In some implementations, one function of the sync router is to synchronize end equipment (endpoint device) over Ethernet using a time synchronization protocol where one piece of end equipment is a timing master and another is a timing slave. In the specific case where the sync router IP resides (an SoC including the sync router IP module), there may be multiple networking interfaces (e.g., 7 Ethernet ports, multiple GPIO ports, etc.). Any of the ports may be defined as either a slave or a master in reference to time (and that definition may change dynamically). Recall that there are two different types of time domains. A first represents an application time domain and the second represents a communication time domain. One interface of an SoC may be master for the communication time domain while concurrently being a slave for the application time domain. It is possible that each of the example 7 ports may be changed individually with respect to their role for either application time or communication time. In some implementations, there may also be a second time synchronization scheme overlaid on top of the first time synchronization scheme. The second time synchronization scheme references the application(s) which can execute on the same SoC as the sync router IP or on a different SoC that is communicatively coupled to the SoC including the sync router IP. Typically when an SoC is a slave, a corresponding communication application can reside on the same SoC or another SoC communicatively coupled to the SoC slave. The communication protocol between the two SoCs can be any of the protocols discussed herein. The slave SoC may communication with devices via PCIe or other communication method to communication with an external analog device (ADC, pwm driver, 24 volt digital input), or a device connected through GPIO.

To summarize, timing information within a TSN is explained in the IEEE standards. Disclosed implementations explain how a TSN may be configured with the disclosed sync router to control roles and communication paths for timing sources within that TSN. For example, the disclosed event sync router may be specifically configured for time sync events and include a set of programmable logic gates as a switch to connect any number of (e.g., 88 in one example) inputs to any number of (e.g., 40 in one example) outputs. Programming may be performed via registers that may be controlled by software logic executing on or communicating with the time sync router SOC. Digital selection control of inputs to outputs may be controlled via a bit-field within the registers. Application software may be responsible for programming the path through the sync router. When a time event arrives at a specific input port the other side of the switch will receive the same or a corresponding event through the currently selected (i.e., programmed) association of input to output passing through the logic gates. A local agent (e.g., software executing in a core of the sync router SoC) may be used to reconfigure sync router paths and may be in communication with external applications.

Referring now to FIGS. 3-4, FIG. 3 illustrates a block diagram of network attached devices and a connection to a TSN portion 305 which is illustrated in further detail in FIG. 4. View 300 includes network 315 which represents a standard network as discussed above in FIG. 1. End devices 320, 325, and 330 represent devices which may be communicatively coupled to TSN 305 but do not represent time sensitive devices. Applications on devices supported by network 315 may provide a view into industrial automation processes supported by TSN 305 but do not directly participate in the activities of the automation process. Of course, interfaces on devices 320, 325, or 330 may initiate control actions that are sent to TSN 305 for processing by applications executing within TSN 305 but these control actions may have to be interpreted by applications that are time aware to make sure that operations within TSN 305 are performed properly. For example, in a process control system, a user may, through a user interface, request shut down of a chemical process but the actual orderly shutdown commands may need to be generated within TSN 305. Similarly, information may be presented on user interfaces to provide information about functions and processes being performed within TSN 305. Servers 341 and 342 of backend processing 340 may similarly be used to maintain historical data, provide reporting information, or provide non real-time analytical processing with respect to information obtained from devices within TSN 305.

FIG. 4 illustrates a more detailed view of TSN 305 from FIG. 3 showing a sync router 405 and multiple endpoints and time sources connected to sync router 405. TSN 305 includes three application time domains identified by dashed outlines 411-413 surrounding different endpoints that include applications within each of application time domain 1 (411), application time domain 2 (412), and application time domain 3 (413). As indicated, endpoints 420-422, 430, and 440 are in AD 1; endpoints 430-433 are in AD 2; and endpoints 440-442 are in AD 3. Note that there is an overlap in application domains and endpoints because each of endpoints 430 and 440 are concurrently in two different application domains. That is, there are multiple applications executing concurrently on each of these endpoints with some of the applications associated with a time domain of TSN 305 that uses a first master time source while other applications use a second master time source. There are also three time communication domains (CDs) referred to as CD 1, CD 2, and CD 3 with participation in each time domain indicated by text within respective endpoints. For example, endpoints 420, 421, 422 and 430 are in CD 1; endpoints 431, 432, 441, and 442 are in CD 2; and endpoints 433 and 440 are in CD 3. In practice, one peripheral port can only be in one time domain at a given instant, but each SoC can have multiple peripherals which can be participating in multiple time domains concurrently.

As further illustrated in TSN 305, sync router 405 is communicatively connected to each of the endpoints that are participating in a time domain (either application or communication) concurrently. Although shown as a single line in FIG. 3, there could be more than one communication path between sync router 405 and a given endpoint. The number of communication paths may be dependent on implementation and configuration of applications executing within TSN 305 at any given point.

Time source 1 (450) through time source N (455) represent a number of possible time source inputs that may be input to sync router 405 so that it can provide time to any of the plurality of time domains that it concurrently supports. These time source inputs may include a variety of protocols as discussed above and may include multiple sources based on the same protocol. For example, there may be multiple PCIe inputs that provide time source information to an SoC configured with a sync router 405. Endpoints in FIG. 3 have a further letter designation of (M) for master or (S) for slave to indicate the role they are currently functioning as within each time domain. Specifically, endpoint 442 is indicated as being the current master of application domain 3 and a slave of communication domain 2. Endpoint 420 is indicated as being a master of both application domain 1 and communication domain 1. Endpoint 432 is indicated as being a master of application domain 2 and slave of communication domain 2. Endpoint 433 is indicated as being the master of communication domain 3 and slave of application domain 2. As illustrated, various combinations and permutations exist for an endpoint to act as a master or slave in different domains with respect to different domain types. Further, master and slave designations are subject to change. As discussed previously, any endpoint may request to change roles within a given domain via communication with sync router 405 or a software control agent (not shown) thereof. The inputs to the sync router represent the possible sources of master time domains and each time slave has the flexibility to choose to synchronize to any chosen time master.

Figure 5:
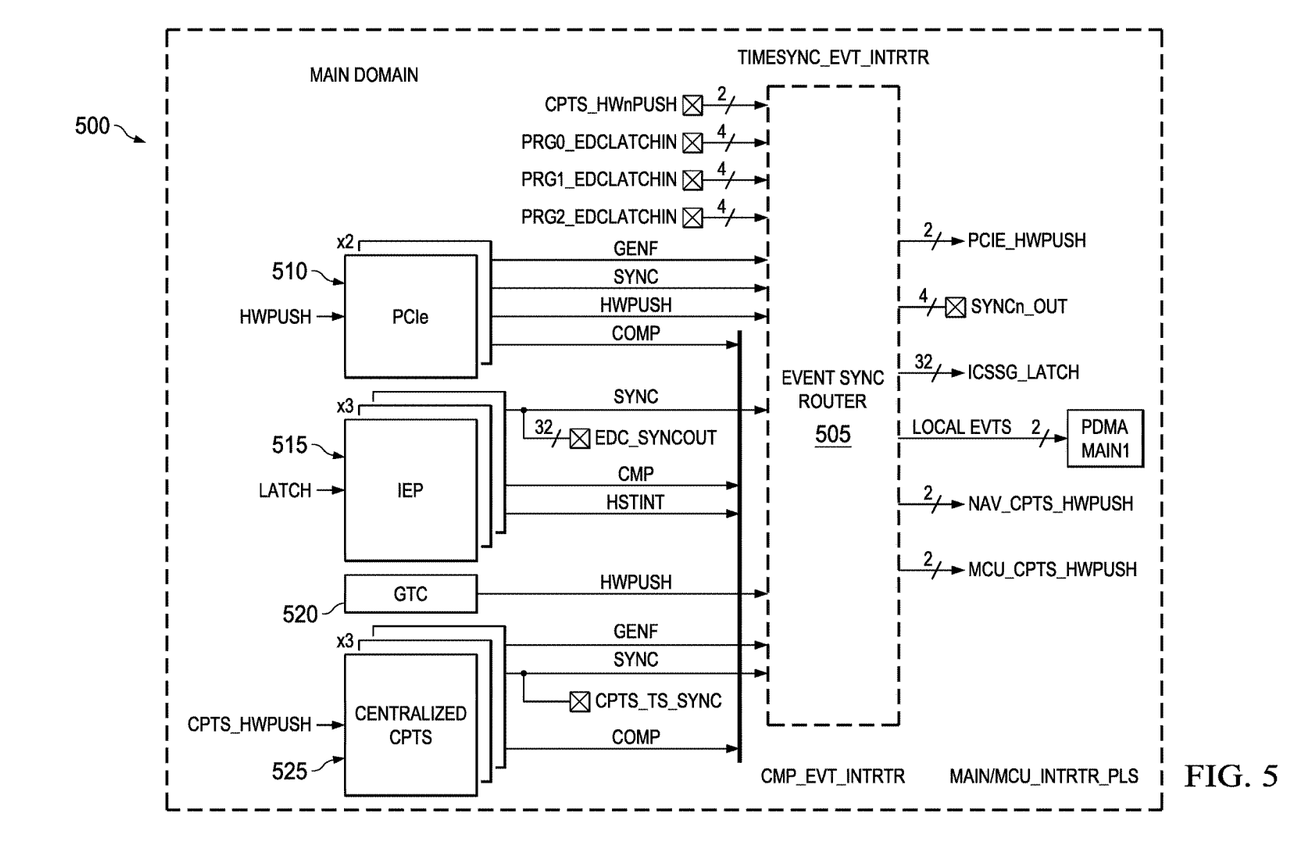
FIG. 5 illustrates a block diagram representing an event sync router, according to one or more disclosed implementations.

Referring now to FIG. 5, view 500 illustrates an event sync router 505 with further details of inputs and outputs of the sync router representing one possible configuration of, for example, sync router 405. Sync router 505 is illustrated with inputs including: PCIe 510, Industrial Ethernet Peripheral (IEP) 515, generic time counter (GTC) 520, and Centralized CPTS 525. As illustrated in FIG. 5, Gen_F represents a programmable pulse width, IEP 515 receives or adjusts timing information for industrial Ethernet, and centralized CPTS 525 is not associated with any peripheral but represents a centralized time stamp module for time stamp logic which can be a source of generating push events. A CPTS may be incorporated into an IEP module or may be stand-alone in different implementations. A CPTS typically contains two major functions. First, on the input side (referred to as HW_push) the CPTS represents a hardware block to calculate timing difference. The operating theory of CPTS (e.g., centralized CPTS 525) is that CPTS performs time stamp for the push events with prior known frequency. Each push event may come from a different time domain. Based on the time stamp difference, the CPTS can calculate the difference between two different time domains. Second, on the output side (referred to as Gen_F) the CPTS can generate periodical events based on a compensated and tuned time domain.

Figure 6:
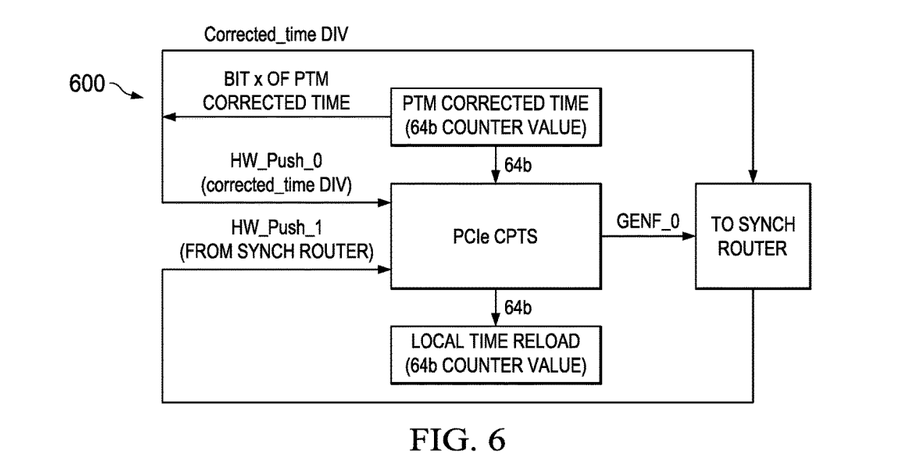
FIG. 6 illustrates a Peripheral Component Interconnect Express (PCIe) view of communication, in either Root Complex (RC) mode or endpoint (EP) mode, with a sync router, according to one or more disclosed implementations.

Referring now to FIG. 6, view 600 illustrates a PCIe view of communication with sync router 405 that may be configured in either Root Complex (RC) mode or endpoint (EP) mode. When PCIe is in RC mode, it provides master time to the PCIe endpoints it is connected to through the network. When a PCIe is configured as an RC in an SoC, that PCIe can take one of the master time domains from the sync router and synchronize that PCIe's RC master time before sending that time to the downstream endpoints through PTM. Alternatively, when a PCIe is in EP mode, that PCIe's time shall be synchronized with the time domain provided by a corresponding RC. Inside the SoC, the recovered PTM from a PCIe endpoint may be used as the master time domain for other peripherals such as industrial Ethernet or for application time domain. As illustrated in view 600, PTM corrected time (64b counter value) from PCIe may be used as a trigger directly. Optionally, GENF_0 allows a more refined and flexible frequency as a trigger. Time stamps may be generated in nanosecond accuracy. As illustrated, routing of bit x of PTM time to PCIe can generate time stamps, for example, bit 20, which may be asserted every 1024*1024 nanoseconds. When PCIe is in EP mode, the PTM clock shall be tuned through the PCIe PTM protocol with no SoC level tuning needed (or possible). The PTM clock recovered by PCIe EP mode can be used as a sync master for the rest of the SoC. Bit x of PTM corrected time may be routed to the sync router as a trigger event for other sync slaves. PCIe CPTS is not used in EP mode. GENF_0 is optional, if software is used to generate trigger events with a different frequency.

Figure 7:
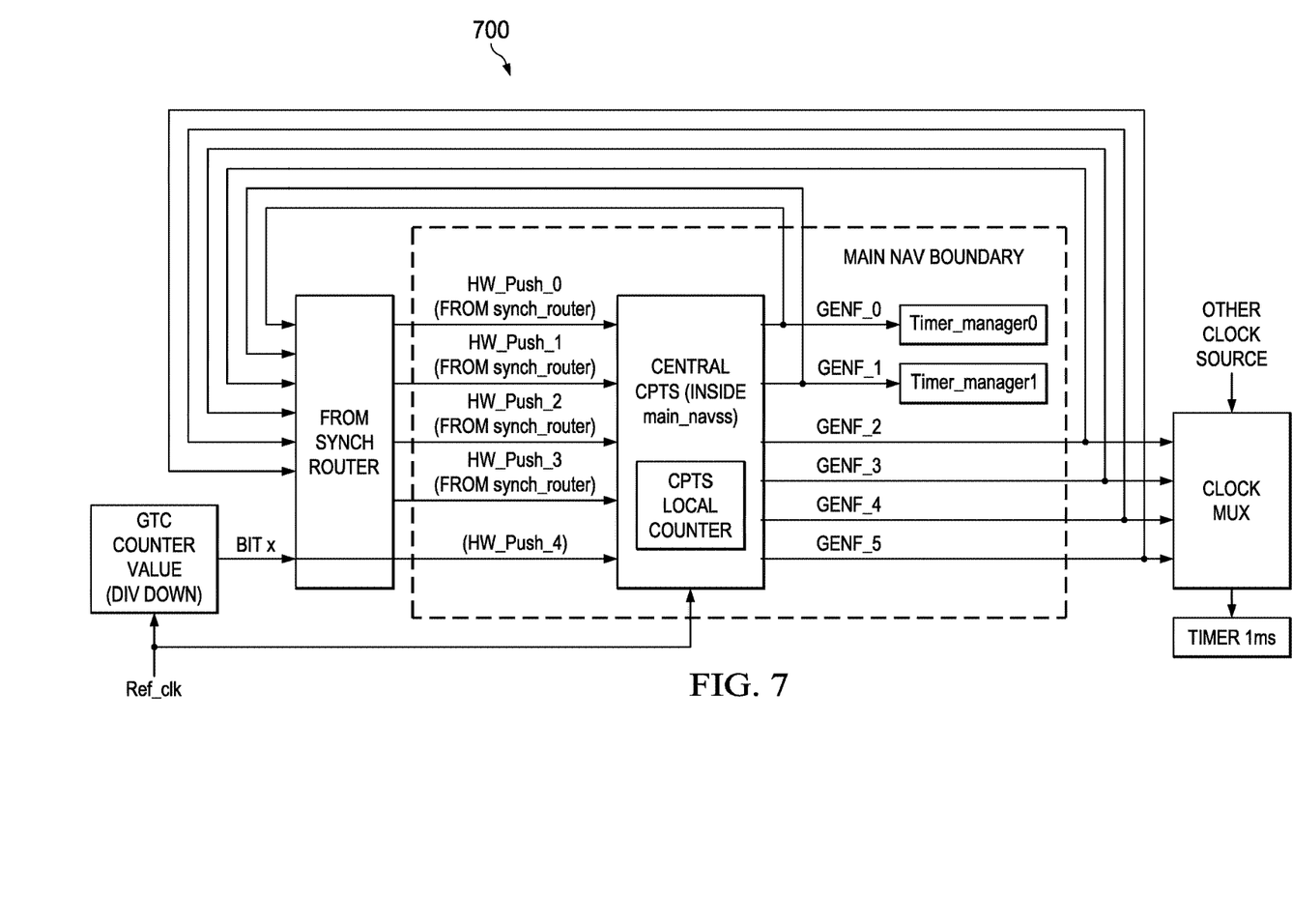
FIG. 7 illustrates a central common platform time sync (CPTS) view of communication with a sync router, according to one or more disclosed implementations.

Referring now to FIG. 7, view 700 illustrates a central common platform time sync (CPTS) view of communication with a sync router, according to one or more disclosed implementations. In this example the same ref_clk may be used to drive GTC, central CPTS and IEP. All time stamp values may be at nanosecond accuracy. All time stamp logic may be driven by the same clock source at, for example, either 200 mhz or 250 mhz. Connecting GTC div_down value (by power of two) may allow software to determine the GTC count value relative to any of the sync masters. Connecting four of the sync outputs to CPTS may allow one tick per any of four time domains. Software may determine the difference among the four time domains, in part, by using the GTC counter value and CPTS local count value. A central CPTS may be used to provide system time latch functions and a clock mux selector for a generic local timer may be implemented at the SoC level.

Figure 8A:
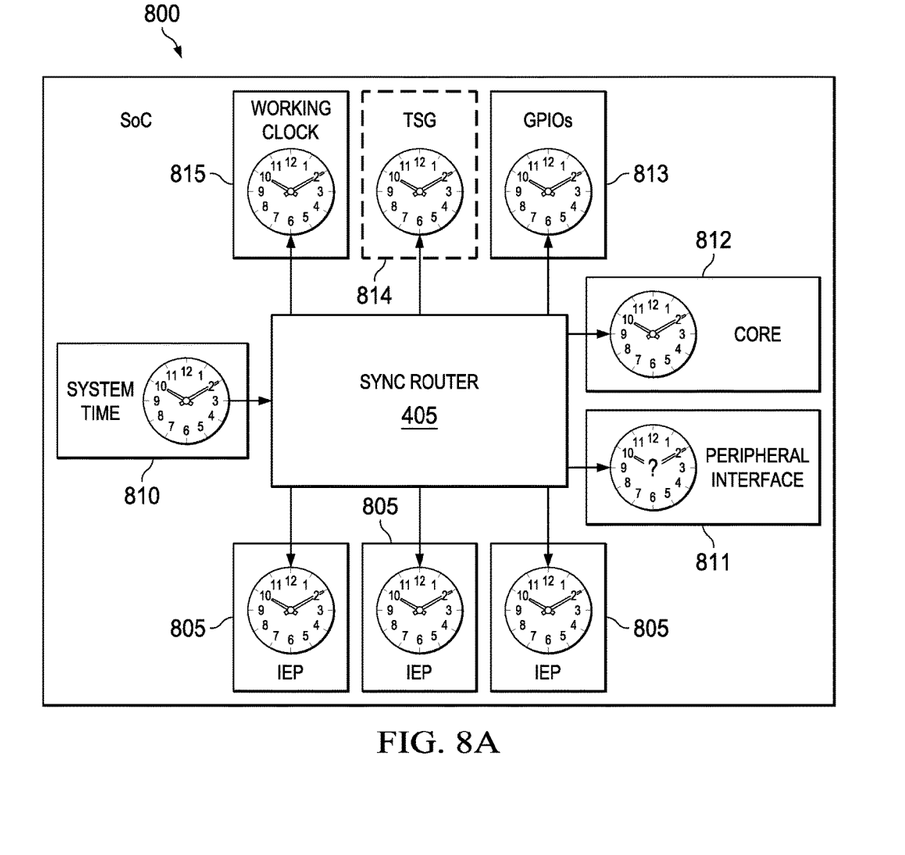
FIGS. 8A-C illustrate a working clock view of an SoC with a plurality of communication ports and control flow information in different configurations, according to one or more disclosed implementations.
Figure 8B:
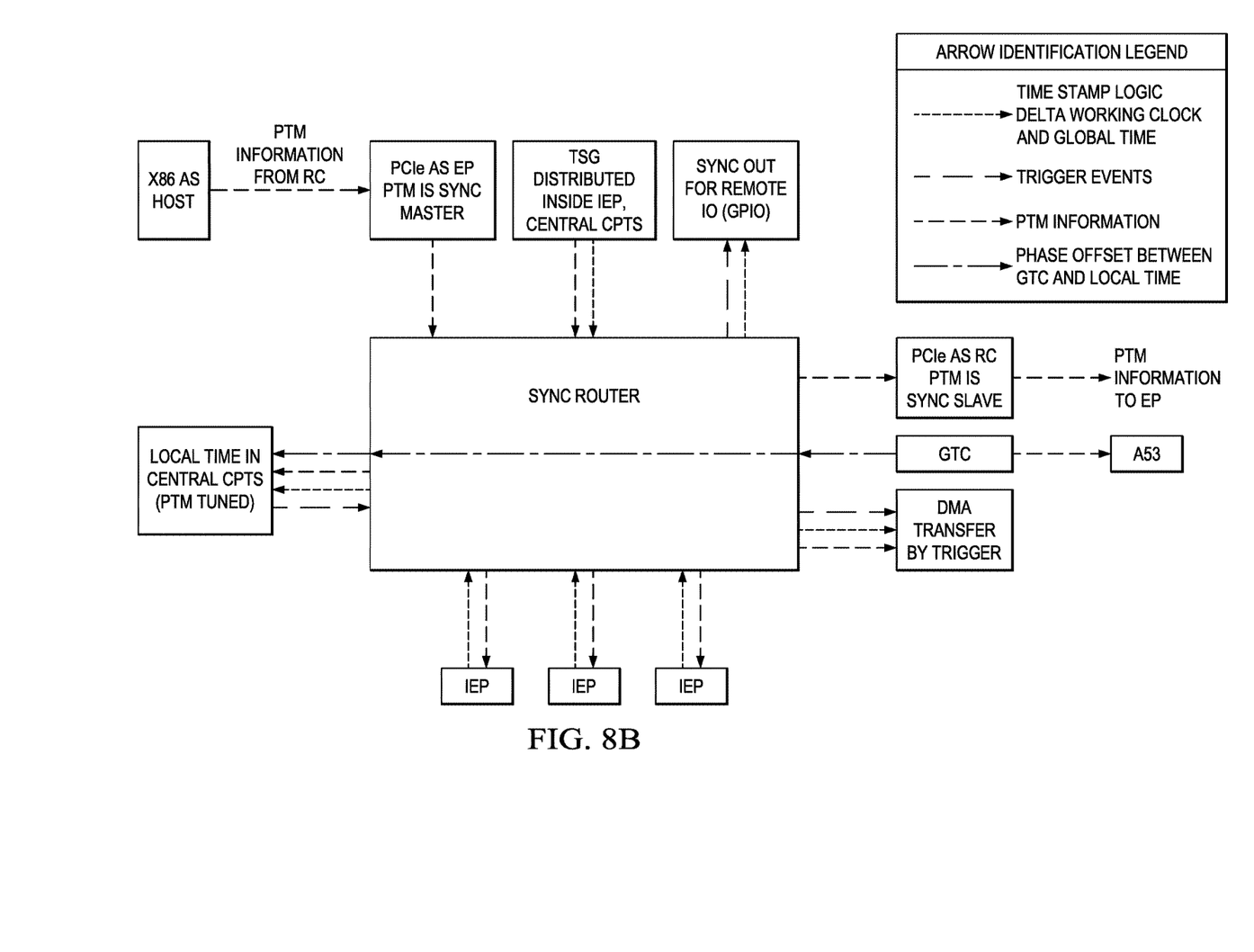
Figure 8C:
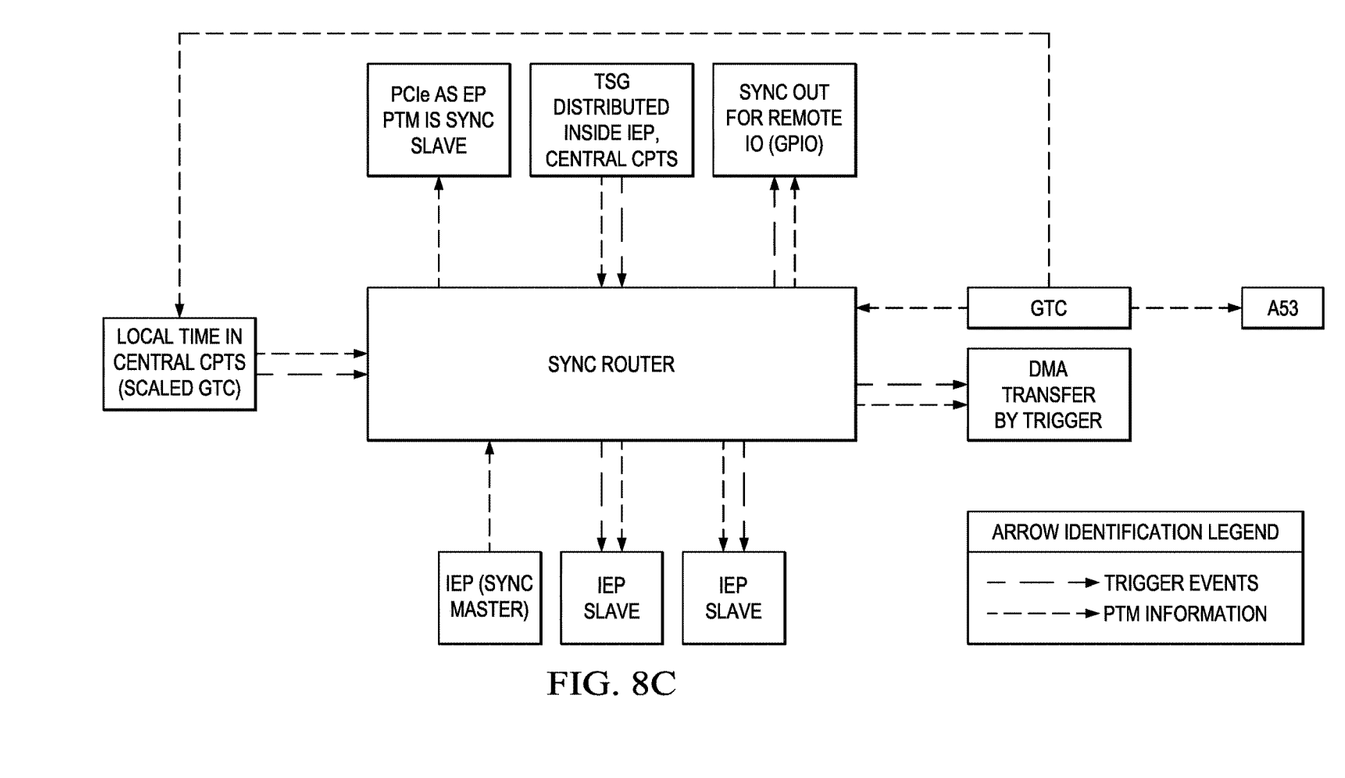

Referring now to FIGS. 8A-C, view 800 of a working clock is illustrated for an example SoC with a plurality of communication ports (e.g., IEPs 805) and control flow information (represented by arrows) in different configurations, according to one or more disclosed implementations. FIG. 8A illustrates an SoC with a sync router 405 and a plurality of other components of an example SoC (System Time 810, Peripheral Interface 811, processor Core 812, GPIOs 813, Time Slice Generator (TSG) 814, and Working Clock 815) as indicated. View 800 represents one example configuration. Other configurations are possible with, more or fewer components than specifically shown in view 800. That is, there may be more or less than exactly three IEP 805 components, there may be components added that are not currently shown, and there may be implementations that do not include each component type that is shown in view 800. This example SoC implementation may be used in accordance with the capabilities of an SoC configured with sync router IP as explained throughout this disclosure. FIG. 8B illustrates a control flow of time information and events with respect to components of FIG. 8A in an example where the sync router is configured as a companion device. FIG. 8C illustrates a control flow of time information and events with respect to components of FIG. 8A in an example where the SoC with sync router is configured as a host device.

Figure 9:
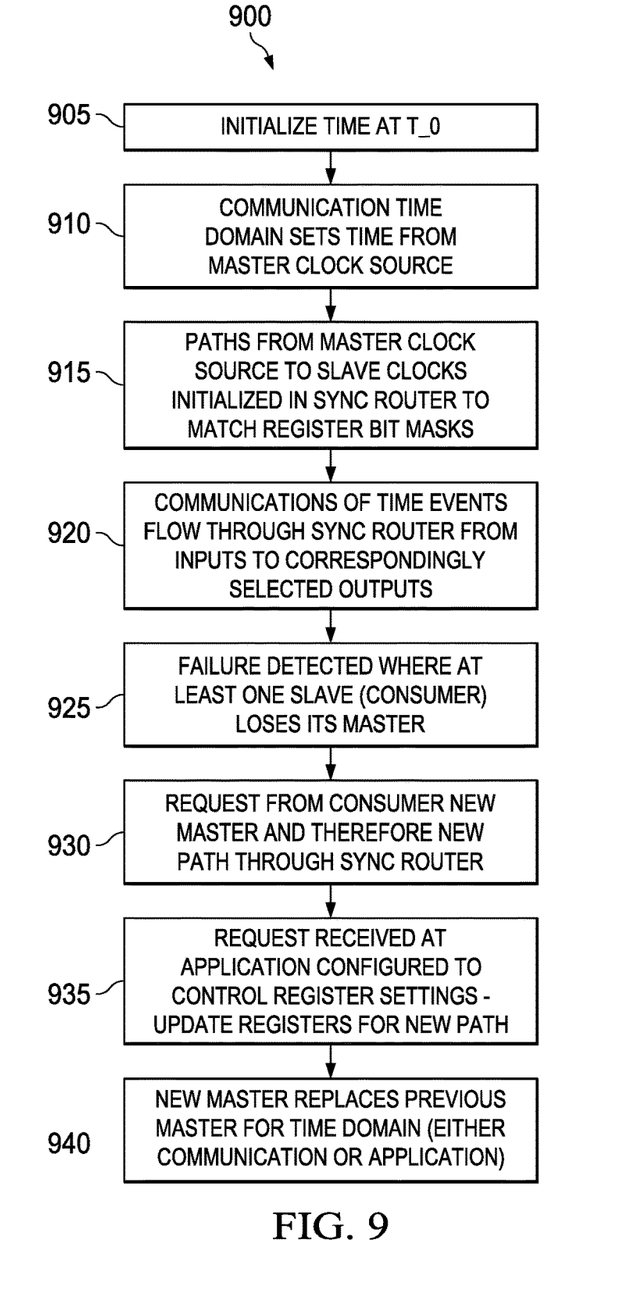
FIG. 9 illustrates process 900 in flowchart form representing one possible set of operations that may be performed to change a master clock source (e.g., fail-over, requested switch) for a time domain within a TSN environment supported by a sync router, according to one or more disclosed implementations.

Referring now to FIG. 9, process 900 is illustrated in flowchart form and represents one possible set of operations that may be performed to change a master clock source (e.g., fail-over, requested switch) for a time domain within a TSN environment (e.g., TSN 305) as supported by a sync router (e.g., 405), according to one or more disclosed implementations. Beginning at block 905 all systems recognize that time is initialized at T_0. At block 910 it is determined for a communication time domain that a particular clock source will be identified as its master clock and time is obtained from that master. Block 915 indicates that paths through the sync router from the master clock source to any slave clocks are set (e.g., initialized) in the sync router as determined by setting of registers to control logic gates through a crossbar switch. The values of registers and paths may be determined using bit masks and may be controlled by a software agent maintaining the values in the registers of the sync router SoC. Block 920 indicates that communications of time events may flow through the sync router from inputs to correspondingly selected outputs as indicated when register values were initially set and logic gates were initially configured. Block 925 indicates that as a result of failure of communication from at least one slave (e.g., time consumer) to its master, an event/alert may be generated that may be detected by an endpoint or application executing within a TSN (e.g., 305). Block 930 indicates that the slave endpoint (e.g., consumer) may initiate a request a new master. In response to this request a communication may be initiated that results in an update to the configuration registers of the sync router (e.g., 405) and correspondingly a new path through the sync router for the slave endpoint that requested the configuration change. Of course, another function, instead of the actual affected endpoint, could have requested the configuration change as a result of detection of communication failure. Block 935 indicates that the request of block 930 may be received at an application configured to control the registers of a sync router and update the new registers to cause the sync router to reconfigure itself (via programmable logic gates) to create the new path. Block 940 indicates that a new master source replaces the previous master source for the time domain (either application or communication) and the previous master may become a slave to that domain or may in fact be offline because of the communication failure. Of course, configuration changes may be made for many reasons and not only as a result of system failure. In such cases, the process may be similar in that a newly requested path is created through the sync router to replace the previous communication path and therefore change the master of a time domain.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors. The terms configured and configurable are closely related. In the context of this disclosure, the term configured may be used to indicate that an item may be preset to operate in a default manner but does not necessarily mean that the item may not be changed and "re-configured" during operation. The term "configurable" may be used to specifically indicate that an item may not be pre-set with any particular default condition but is likely (but not required) to change at run-time, during operation, or at some point in its existence.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A system on a chip (SoC) integrated circuit (IC), comprising:
   one or more registers;
   a plurality of programmable logic gates configured to provide a configurable communication path, between a first selected input of a plurality of inputs and a first selected output of a plurality of outputs, based on a value stored in the one or more registers;
   at least a first of the plurality of inputs configured for being communicably coupled to a first time source;
   at least a second of the plurality of inputs configured for being communicably coupled to a second time source;
   a first subset of the plurality of outputs configurable to provide first timing information determined from the first time source; and
   a second subset of the plurality of outputs configurable to provide second timing information determined from the second time source,
   wherein the first selected input is configured to represent information pertaining to a first timing master, the first selected output is configurable to provide timing information to a first timing slave, the first timing master and the first timing slave supporting a first time domain within a time-sensitive network (TSN), the first timing master deriving the first timing information for the first time domain from either the first time source or the second time source;
   wherein a second selected input of the plurality of inputs is configured to represent information pertaining to a second timing master, a second selected output of the second subset is configurable to provide timing information to a second timing slave, the second timing master and the second timing slave supporting a second time domain within the TSN, the second timing master deriving the second timing information for the second time domain from a different one of the first time source or the second time source than the first time domain; and
   wherein the SoC is configured to provide both the first timing information and the second timing information concurrently.

2. The SoC of claim 1, wherein the first time source is selected from the group consisting of global positioning satellite, industrial Ethernet, and peripheral component interconnect express.

3. The SoC of claim 1, wherein the SoC is configured to support at least four time domains within the TSN concurrently.

4. The SoC of claim 1, wherein the first time domain is a communication time domain and the second time domain is an application time domain within the TSN.

5. The SoC of claim 1, wherein the first time domain and the second time domain are different application time domains within the TSN.

6. The SoC of claim 1, further comprising a memory storing program code that, when executed, causes the SoC to adjust the value stored in the one or more registers to cause the plurality of programmable logic gates to reconfigure the configurable communication path to alter timing information provided to the first selected output from the first timing master to a new timing master in the first time domain.

7. The SoC of claim 6, wherein the program code, when executed, further causes the SoC to adjust the value responsive to a request from a device associated with a timing slave corresponding to the first selected output.

8. The SoC of claim 6, wherein the first time domain is an application time domain.

9. The SoC of claim 8, wherein the program code, when executed, further causes the SoC to adjust the value responsive to a request from a device associated with a timing slave corresponding to the first selected output.

10. The SoC of claim 9, wherein the request originates from an application executing on the device and associated with the first application time domain.

11. The SoC of claim 9, wherein the request originates based on a recognition of network communication failure in at least a portion of the TSN.

12. The SoC of claim 1, wherein the first time domain of the TSN represents a first portion of an industrial automation process and the second time domain represents a second portion of the industrial automation process, the first and second portions having related operations that do not require real-time coordination with each other, the first and second portions being performed concurrently, the first portion comprising a first plurality of operations that are performed with real-time coordination with each other, and the second portion comprising a second plurality of operations that are performed in real-time coordination with each other.

13. A system on a chip (SoC) integrated circuit (IC), comprising:
    a plurality of programmable logic gates;
    one or more registers configured to control the plurality of programmable logic gates;
    a plurality of inputs to a crossbar switch comprising the plurality of programmable logic gates;
    a plurality of outputs from the crossbar switch, wherein programming of the plurality of programmable logic gates completes a communication path through the crossbar switch from a first input of the plurality of inputs to a first output of the plurality of outputs;
    a first and a second time input source; and
    a plurality of interfaces configured to communicate time information, via a communication network, using a plurality of protocols of a time-sensitive network (TSN), the TSN representing at least a portion of the communication network,
    wherein the SoC is configured to provide coordinated time domain information in the TSN and support at least two different time domains, a first portion of the plurality of outputs providing first timing information for a first time domain corresponding to the first time input source, a second portion of the plurality of outputs providing second timing information for a second time domain corresponding to the second time input source, wherein the second portion is mutually exclusive of the first portion, the first timing information propagated through the communication path of the crossbar switch and associating a timing slave in the first time domain with a timing master in the first time domain, the timing information for the first and second time domain provided concurrently to respective endpoints in the first time domain and the second time domain.

14. The SoC of claim 13, wherein the first time input source is selected from the group consisting of global positioning satellite, industrial Ethernet, and peripheral component interconnect express.

15. The SoC of claim 13, wherein the SoC is configured to support at least four time domains within the TSN concurrently.

16. The SoC of claim 13, wherein the first time domain is a communication time domain and the second time domain is an application time domain within the TSN.

17. The SoC of claim 13, wherein the first time domain and the second time domain are different application time domains within the TSN.

18. The SoC of claim 13, further comprising a memory storing program code that, when executed, causes the SoC to adjust a value stored in the one or more memory registers to cause the plurality of programmable logic gates to reconfigure the communication path to alter the communication path through the crossbar switch from the first input of the plurality of inputs to a second output of the plurality of outputs, the second output corresponding to a new timing master in the first time domain.

19. The SoC of claim 18, wherein the program code, when executed, further causes the SoC to adjust the value responsive to a request from a device associated with a timing slave corresponding to the first output.

20. The SoC of claim 18, wherein:
    the first time domain is an application time domain,
    the program code, when executed, further causes the SoC to adjust the value responsive to a request from a device associated with a timing slave corresponding to the first selected output, and
    the request originates from an application executing on the device and associated with the first application time domain.

21. A system on a chip (SoC) integrated circuit (IC) configured to support a plurality of different time domains within a time-sensitive network (TSN) concurrently, the SoC comprising:
    time event sync router IP, the time event sync router IP comprising an event router configurable to control communication paths between a plurality of time masters active on the SoC and a plurality of time slaves supported by outputs of the event router, the plurality of time masters each associated with a different input time source and a selected input of the event router;
    first program logic configured to control a plurality of registers on the SoC, the plurality of registers configured to program a plurality of logic gates to create the communication paths from a selected time master to a corresponding set of outputs representative of each different time domain; and
    second program logic configured to receive requests originating from endpoints associated with an individual time slave to affect the plurality of registers to alter a communication path through the event router to cause the individual time slave to obtain a new time master for a current time domain of the individual time slave.

22. The SoC of claim 21, wherein a first time source is associated with a first time master and the first time master is configured to receive time information from a device selected from the group consisting of global positioning satellite, industrial Ethernet, and peripheral component interconnect express.

23. The SoC of claim 21, wherein the SoC is configured to support at least four time domains within the TSN concurrently.

24. The SoC of claim 21, wherein a first time domain is a communication time domain and a second time domain is an application time domain within the TSN.

25. The SoC of claim 21, wherein a first time domain and a second time domain are different application time domains within the TSN.

* * * * *